Nov. 3, 1936.        E. C. KIEKHAEFER        2,059,244
AUTOMATIC BRAKE
Filed Aug. 9, 1935        2 Sheets-Sheet 1
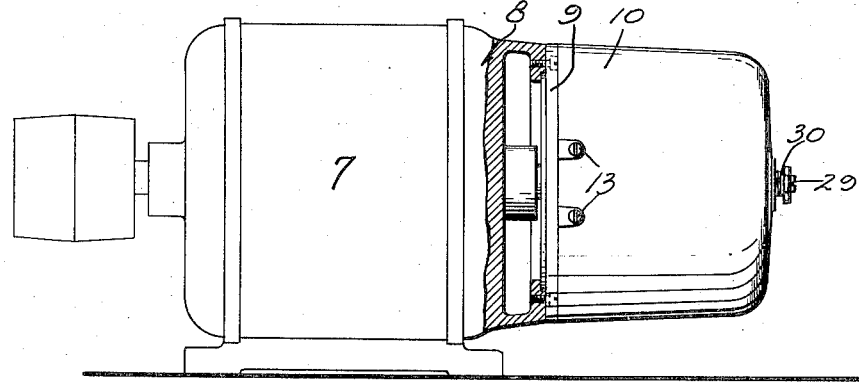
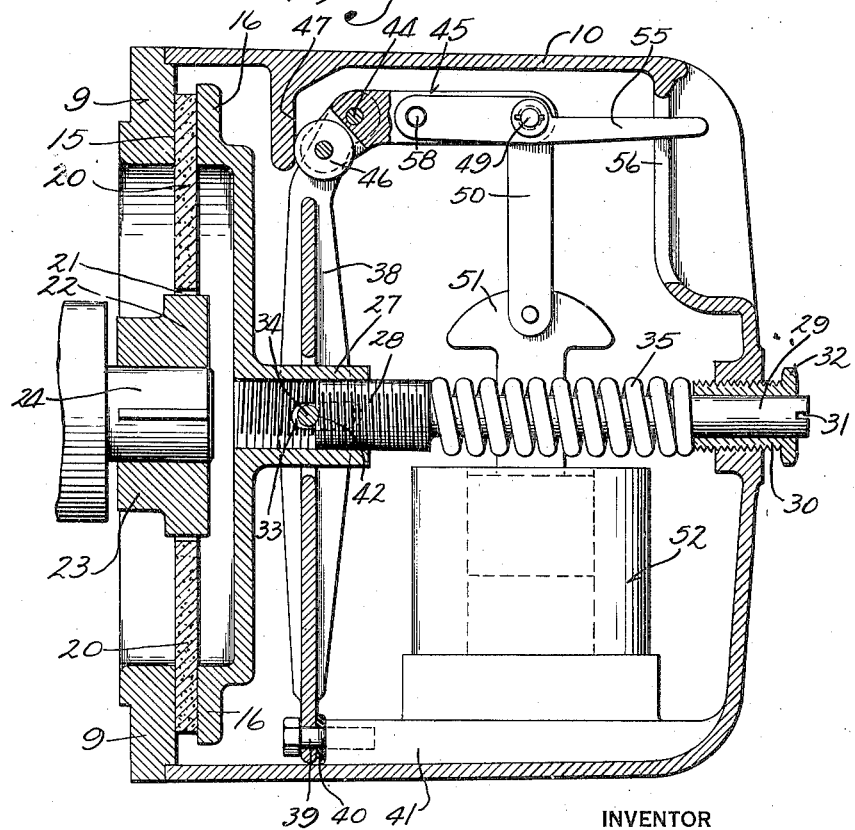

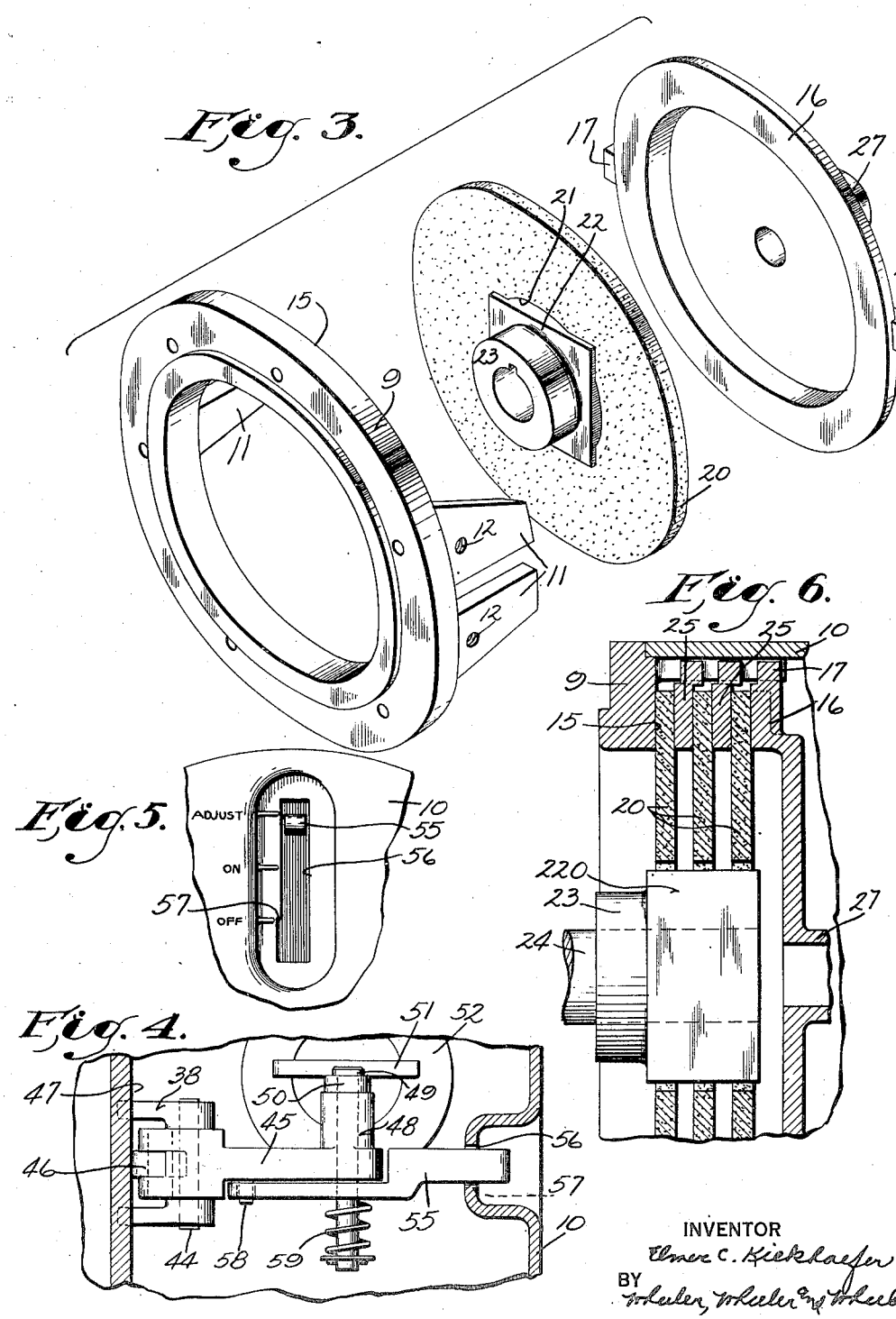

Patented Nov. 3, 1936

2,059,244

UNITED STATES PATENT OFFICE 2,059,244

AUTOMATIC BRAKE

Elmer C. Kiekhaefer, Milwaukee, Wis., assignor to Stearns Magnetic Manufacturing Company, Milwaukee, Wis., a corporation of Wisconsin Application August 9, 1935, Serial No. 35,411

22 Claims. (Cl. 188—171)

This invention relates to improvements in automatic brakes.

The brake herein disclosed is of the type applied to the armature shaft of an electric motor and electrically controlled in accordance with the operation of the motor to release the shaft when the motor is functioning, and to engage the shaft with predetermined braking pressure when the current to the motor is cut off, thus braking the motor and any mechanism connected to be driven thereby.

While the brake to which this invention pertains has particular advantages in association with a motor casing by reason of its compact and symmetrical organization, its utility is by no means limited to its use in connection with a motor. On the contrary, it may be used in conjunction with any rotary part upon which an automatically controlled and electrically operated braking function is required.

It is one of the important objects of the invention to provide a novel and improved type of automatic brake compactly organized to be disposed symmetrically with reference to the armature shaft and casing of a motor. More specifically, I propose to provide a brake housing attachable as an extension to the motor shell to project axially therefrom entirely within the projected outline of the motor, and to contain not only the brake but all of the operating and controlling mechanism therefor. To this end a special system of levers and links has been devised and arranged to be actuated by a centrally disposed pressure spring and an axially offset solenoid.

It is another important object of the invention to provide a brake control and indicating system in which a lever projecting through the brake housing is effective to indicate not only the "on" and "off" status of the brake at all times, but also its condition with respect to such wear as may be the occasion for readjustment. At the same time I propose to provide for the use of this lever as a means of manually operating the brake for the release thereof, as may from time to time be desirable to permit the motor shaft to turn when the current is off. In connection with this operating and indicating system I have provided a novel and improved means of adjustment.

It is a further object of the invention to provide a novel and improved brake structure such that the brake disks subject to wear are almost instantly accessible for replacement and have a novel and improved mounting, which improves their operation as well as facilitates the replacement operation.

It is a further object of the invention to provide a brake structure in which one or more of the friction elements of the brake are fully floating to ensure self-alignment and the elimination of destructive strains. More particularly, it is my purpose to provide, in conjunction with a rigidly mounted member, a floating lining disk and a co-operating pressure plate, the pressure plate being in tongue and groove connection with the rigid member to restrain it against rotation while permitting it perfect freedom of self-adjustment whereby to localize all strains and stresses in the rigid member independently of the housing within which the parts are contained.

It is a further object to provide a brake structure with a novel combination of adjustment means providing for instant regulation to increase or decrease the horse power brake pressure, and a separate adjustment to compensate for lining wear, either of said adjustments being independently operable to adapt the brake for any condition.

Other objects will appear from the following disclosure.

In the drawings:

Figure 1 is a view of my improved brake as applied to a conventional electric motor, a portion of the adapter being broken away to an axial section to expose the mounting arrangement.

Figure 2 is a view on an enlarged scale taken in section axially through the brake.

Figure 3 is a detail view in perspective showing the component parts of the brake in exploded relation.

Figure 4 is a fragmentary detail view taken in section through a portion of the brake housing showing the operating mechanism and solenoid in plan.

Figure 5 is a fragmentary detail view of the housing and the indicating and adjusting lever in end elevation.

Figure 6 is a fragmentary detail view similar to Figure 2, showing the slightly modified embodiment of the invention.

Like parts are identified by the same reference characters throughout the several views.

In Fig. 1 I have shown at 7 a housing or shell of a conventional electric motor to which there has been an adapter applied at 8 to serve as a mounting for my improved brake mechanism. To the adapter is screwed the mounting ring 9 (Figs. 1, 2, and 3), which is shouldered to receive the brake casing 10 and is provided with two pairs of spaced arms 11 having holes at 12 to which the brake casing is detachably connected by screws 13.

The mounting ring 9 is surfaced at 15 to serve as one of the stationary brake disks. At least one additional clutch disk preferably takes the form of the pressure plate 16 which has legs 17 guided in the slots between the spaced arms 11, as will readily be understood from Fig. 3. The arms 11 provide a strong and substantially wear-free means of restraining the pressure plate or stationary brake disk 16 against rotation.

Interposed between the finished annular brake surfaces of the mounting ring 9 and the pressure disk 16 is at least one rotatable brake disk 20 which, in the preferred embodiment of this invention, consists of a disk of brake lining or the like which may be made of any material suitable for brake facing or brake lining and sufficiently self-supporting to require no backing plate. However, instead of serving as a lining or facing, the disk 20 is unsupported and floating between the co-acting disks. It has at its center a square opening (or an opening with square corners), as shown at 21 in Fig. 3. This opening has a sliding fit onto the perimeter of the square block 22 which has a hub 23 splined to the armature shaft 24 of the motor.

The fact that the disk 20 is not backed with metal and is unsupported by rivets or screws, gives it numerous advantages. In the first place, its inertia is extremely low, this being a very desirable objective in apparatus of the character to which this invention pertains. Secondly, the absence of rivets and the like eliminates the scoring of co-acting friction surfaces which might otherwise occur. In the third place, it promotes economy because both faces of the friction disk are available and active in the performance of the braking function, the replacement being likewise simplified. Quiet operation is enhanced and the contact of lining to metal has been found to wear longer than is the case where a metal plate serves as a support for the lining. There is greater compactness than would be the case if equivalent braking surfaces were provided by pushing two linings to an intervening metal backing disk. Chatter and erratic operation are eliminated, as is also the possibility of improper fastening of the lining to the supporting disk.

Obviously the hole in the lining 20, and the corresponding form of the lock 22, may comprise any geometric figure other than a circle (a triangle, square, hexagon, etc.).

Obviously, where the load of the brake is to be heavy, I may increase its effectiveness by increasing the number of disks and correspondingly extending the arms 11 and the axial length of the block 22. This is indicated in Fig. 6, in which the block 22 has been somewhat elongated to receive three identical disks 20 between the mounting ring 9 and the pressure disk 16. Between each pair of flexible disks 20 is interposed an annulus 25 having lugs guiding in the slot between the arms 11, exactly like the pressure ring 16, and thereby held against rotation. This arrangement makes it possible to vary the effective braking torque to meet any requirement simply by selecting an appropriate number of disks.

The brake disks are normally subject to a brake-applying pressure. The pressure plate 16 is provided at its axis with an integral sleeve 27 which is interiorly threaded to provide for the adjustment of the spring abutment plug 28 which is in threaded connection therewith. This plug has a stem 29 slidable through the spring seat bushing 30 and provided at its end with a screw driver slot 31, by means of which the plug may be rotated for its adjustment in and out of the sleeve 27. Wound about the stem 29 is a compression spring 35 having one of its ends seated against the plug 28, and the other end seated against the bushing 30. By applying a wrench to the flange 32 of bushing 30, it is possible to adjust the compression of the spring 35, thereby determining the amount of pressure transmitted by the spring through the plug 28 and sleeve 27 to the pressure plate 16.

The adjustment of bushing 30 to vary the spring pressure makes it possible to increase or decrease the torque of the brake which may thereby be varied to any predetermined value within a wide range, limited only by the power of the magnet. This important adjustment is entirely independent of the lining wear adjustment.

As the disk 20 becomes worn, the movement of the pressure plate 16 to the left, as viewed in Fig. 2, might tend to extend spring 35 if the wear were not compensated by unscrewing the plug 28 sufficiently to compensate for the wear. By making this adjustment from time to time it is possible to keep the position of plug 28 a constant for any given brake position throughout the life of the clutch disk 20.

The sleeve 27 of the pressure plate 16 is provided in its sides with a slot 33 for the cross pin 34, which connects the two parts of a bifurcated lever 38. This lever is fulcrumed upon a cap screw means 39 loosely holding its lower end to a gasket or cushion of rubber or the like, which is shown at 40, and which is interposed between the lower end of the lever and the casing abutment 41 into which the cap screw means 39 is threaded.

The pin 34 engages in a shallow groove 42 in the end of the plug 28, whereby yieldably to maintain said plug in any rotative position in which it may be adjusted to register the groove with the pin.

At its free upper end the bifurcated lever 38 carries another cross pin 44 upon which is pivoted the cam lever 45. The cam lever bears a cam roller 46 co-acting with a bearing partition 47 which is integral with the brake housing 10. The arrangement is such that the oscillation of the cam lever 45 clockwise, as viewed in Fig. 2, will cause the roller 46 to interact with partition 47 to develop a powerful cam action oscillating lever 38 to the right, as viewed in Fig. 2, and thereby retracting the brake pressure plate 16 to release the brake.

The cam lever 45 carries at 48 a boss for the link pin 49, upon which the link 50 is pivoted for connection with the armature 51 or a solenoid or other magnet 52 connected either in series or parallel with the motor to be energized when the motor is energized. Thus, the energization of the motor energizes the coil, which attracts its armature 51 and oscillates the cam lever 45 to release the brake. When the motor and magnet are de-energized, the armature 51 is released and the brake is applied with a pressure determined by the spring 35 and the pair of clutch disks which may be employed.

I provide at 55 an indicator lever which is an extension of cam lever 45. The end of lever 55 projects through a slot 56 in the brake housing 10 into operative proximity to certain symbols appearing on the outer face of the housing.

As will be observed in Fig. 5, there is an index line marked with the word "adjust" beneath which appears an index line marked with the word "on", and near the bottom of the slot is an index line marked with the word "off". Adjacent the index line designated with the word "off" the slot 56 is widened to provide a shoulder 57, the purposes of which will presently be apparent.

The indicator lever 55 is not in rigid connection with the cam lever 45. Its inner end engages over a peg at 58 with a fit sufficiently loose to permit the lever 55 to be oscillated laterally with respect to the cam lever 45. The intermediate portion of lever 55 is loosely supported on the projecting end of pin 49, being subject, however, to the action of a light compression spring 59, which tends to hold lever 55 in lateral engagement with lever 45.

The position of the projecting end of lever 55 affords a visible indication of the condition of the brake. If the brake is in proper adjustment the free end of the indicator lever 55 will rest opposite the indicator line bearing the word "on" at such times as the brake is engaged. When the magnet acts to release the brake the indicator lever 55, if the brake is in proper adjustment, will move downwardly opposite the indicator line which is marked "off".

As the flexible disk 20 becomes slightly worn, however, the slight compensatory movement of pressure plate 16 under the thrust of spring 35 will be transmitted through the plug 28 and cross pin 34 to the bifurcated lever 38, and thence through the cam lever 45 to produce a magnified displacement of the indicator lever 55. It will only require a slight degree of wear to allow the indicator lever to assume, with the brake "on", the position shown in Figs. 2 and 5, wherein such lever has stopped adjacent the line marked "adjust".

Thereupon the operator will apply a screw driver to the slot 31 of the adjusting stem 29 and will unscrew the plug 28 for a quarter or half turn, which will be sufficient in the preferred embodiment of the invention to move the lever down to its proper position opposite the line marked "on".

Lever 55 serves not only as an indicator but also as a means by which the brake may be manually operated to its released position. It is of course released automatically only when the motor and solenoid are de-energized. Sometimes, however, it becomes desirable to turn by hand either the motor or the mechanism connected therewith, and for such operations the brake may be manually released by pushing the lever 55 downwardly and then thrusting it laterally into engagement beneath the shoulder 57 against the compression of the light spring 59. A frictional engagement of the lever with the shoulder will be maintained by the compression of spring 35, which is constantly acting in a direction to force the indicator lever upwardly as viewed in Fig. 2. Thus, the brake will remain held in its "off" position for any desired period.

It is not necessary for the operator to manually restore the parts to operative position, although he may reapply the brake manually if he wishes. If he leaves the brake in its "off" position, the first energization of the magnet which oscillates the cam lever 45 clockwise as viewed in Fig. 2 will relieve the pressure which holds lever 55 frictionally beneath shoulder 57, and under such circumstances the light spring 59 will restore lever 55 to its normal central position, wherein it will clear shoulder 57 and allow the brake to move to its "on" position when the magnet is again de-energized.

It has been found that a brake embodying this invention will outwear other brakes many fold without requiring replacement of the flexible brake disk 20, which, being entirely free, as well as flexible, accommodates itself to the requirements of the apparatus without distortion or excessive wear. However, when such disk requires replacement it is only necessary to unscrew four screws 13 to remove the brake housing 10. Removal of the housing carries with it all of the control mechanism and also the pressure plate, which slides from between the arms 11, leaving the disk 20 fully exposed and free for removal. The disk 20 may then be slid from its squared mounting block 20 and replaced.

As above noted, the adjustment which restores the indicator lever 55 to its normal range of operation also maintains a substantially constant compression on spring 35, but such compression may be increased or decreased as desired by manipulation of the bushing 30.

Unlike other automatic brake devices for this purpose, the entire apparatus as herein disclosed is housed within a radius no greater than that of the motor casing itself. The brake housing 19 is symmetrical about the axis of the motor armature shaft. This adapts the device for use in locations where other brake devices could not be installed and thus satisfies one of the important objectives of this invention.

It is to be noted, moreover, that although the cam operation by which the brake is disengaged is a very delicate and sensitive movement involving only a very slight manipulation of the pressure plate, nevertheless the adjustment herein provided is so developed that the cam lever and roller always move through the same angle and range during the normal operation of the parts.

In a sense, the terms "solenoid" and "magnet" as used herein may be regarded as generic. For many purposes any other source of power would be fully equivalent.

I claim:

1. In a device of the character described, the combination with brake mechanism including a spring actuated member, of a lever engaging said member and provided with a free end, a second lever fulcrumed on the free end of the first lever and provided with a cam roller, a cam surface with which said roller co-acts for the oscillation of said first lever upon the oscillation of the second lever, and means for oscillating the second lever.

2. In a device of the character described, the combination with a brake including a pressure plate and means for applying pressure thereto, of means for relieving such pressure comprising a lever pivoted adjacent one end and engaged adjacent an intermediate portion with said pressure applying means, a cam lever pivoted to the free end of said first mentioned lever, a magnetic device having a movable part operatively connected to the cam lever, and means for adjusting said pressure applying means with reference to said pressure plate.

3. The combination with a brake mechanism comprising a pressure plate movable upon its axis and a housing enclosing said plate and within a substantially symmetrical outline about said axis, a pressure applying means disposed substantially at the axis of said plate and adjustable axially with reference thereto, a compression spring interposed between said means and the end of the housing, and means for relieving said plate of the pressure of said pressure applying means, said relieving means comprising a lever system and magnet assembled within said housing.

4. In a device of the character described, the combination with a brake including a pressure plate having a central sleeve and plug screw-threaded in said sleeve and provided with a stem, a housing for said plate from which said stem projects, and a spring about said stem confined between said housing and said plug and adapted adjustably to subject said plate to pressure.

5. In a device of the character described, the combination with a brake including a pressure plate having a central sleeve and plug screw-threaded in said sleeve and provided with a stem, a housing for said plate from which said stem projects, and a spring about said stem confined between said housing and said plug and adapted adjustably to subject said plate to pressure, said housing having a threaded bushing for said stem adjustable in the housing and comprising a pressure adjusting abutment for the other end of said spring.

6. In a device of the character described, the combination with a brake pressure plate having a threaded sleeve with a transverse slot, of a spring abutment threaded in said sleeve, a spring provided with a suitable mounting and bearing against said abutment to subject said plate to pressure, means for adjusting said abutment in said sleeve, and a brake disengaging system comprising a lever having a connection through said slot with said abutment, whereby to partake of the adjustment thereof respecting said sleeve.

7. In a device of the character described, the combination with a brake mechanism including a pressure plate having a central sleeve with a transverse slot, of a spring abutment in threadedly adjustable engagement in said sleeve, means for adjusting said abutment, a compression spring having a suitable anchorage and bearing against said abutment, a lever provided with means extending through said slot into engagement with said abutment, a cam lever mounted upon the first lever and provided with a cam surface against which its end is engaged, and a magnet offset laterally from said spring and having an armature provided with a link connection to said cam lever for the oscillation thereof to displace said sleeve in a direction to relieve said plate of the pressure of said spring.

8. In a device of the character described, the combination with a brake mechanism including a pressure plate having a central sleeve with a transverse slot, of a spring abutment in threadedly adjustable engagement in said sleeve, means for adjusting said abutment, a compression spring having a suitable anchorage and bearing against said abutment, a lever provided with means extending through said slot into engagement with said abutment, a cam lever mounted upon the first lever and provided with a cam surface against which its end is engaged, and a magnet offset laterally from said spring and having an armature provided with a link connection to said cam lever for the oscillation thereof to displace said sleeve in a direction to relieve said plate of the pressure of said spring, said cam lever having indicator means with respect to which it is movable to indicate the status of the brake.

9. In a device of the character described, the combination with brake mechanism including a pressure plate, of a spring abutment adjustable respecting said mechanism, a spring acting on said abutment, means including a lever system engaging said abutment and operable for the release of the pressure thereof on said plate, and an indicator scale with respect to which a portion of said lever system is movable, whereby to indicate the position of said plate and the need for adjustment between said plate and abutments.

10. In a device of the character described, the combination with an extension housing for a motor casing, said housing being substantially concentric with the motor armature shaft, of a brake disk mounting for the armature shaft, a brake disk carried by said mounting, a brake disk co-acting with said first mentioned brake disk and slidable within said housing, a spring abutment adjustable respecting the second brake disk, a spring confined within said housing and exerting pressure through said abutment upon said second brake disk, an indicator scale upon the exterior of said housing, said housing being slotted adjacent said scale, and brake disengaging means comprising a lever system operatively connected to engage said abutment in opposition to the pressure of said spring thereon, said lever system including a portion extended through said slot into operative relation to said scale.

11. In a device of the character described, the combination with a housing comprising an extension for a motor casing, a brake disk mounting within said housing adapted for attachment to an armature shaft, brake disks operatively assembled within said housing and respectively provided with connection to said housing and said mounting, a pressure spring within said housing, a pressure transmitting abutment arranged to receive the pressure of said spring and adjustably connected with one of said disks to effect a bearing engagement between said disks, a lever system within said housing for the release of the pressure of said spring from said disk, a lever extension operatively connected to partake of the movement of said system and mounted for independent lateral movement, and an indicator on said housing with respect to which said lever extension is movable, said housing having a shoulder behind which said extension may be engaged when laterally displaced and said lever system having spring means biasing said extension for the return thereof from beneath said shoulder.

12. In a device of the character described, the combination with a stationary brake disk adapted for connection to a motor casing, and provided with axially projecting arms, of a housing detachably connected with said first mentioned disk, a pressure plate axially movable along said arms and interlocked therewith against rotation, a rotatable disk mounting provided with a connection for an armature shaft, a rotatable disk on said mounting interposed between said first disk and said plate, said rotatable disk and mounting having complementary non-circular contours constraining said rotatable disk to turn with said mounting while permitting said rotatable disk freedom of axial movement upon said mounting, and means within said housing for applying pressure to said plate for braking action upon said rotatable disk and for automatically releasing said pressure.

13. In a device of the character described, the combination with a mounting member centrally apertured to receive a shaft requiring the retarding effect of a brake, of a shaft receiving hub, a brake disk mounted thereon, a pressure plate having a floating tongue and groove connection with said mounting member, whereby to be free for axial movement and restrained against rotation respecting said member, said disk being confined between said member and plate, and a housing surrounding said disk and plate and detachably connected with said member.

14. In a device of the character described, the combination with a mounting member centrally apertured to receive a shaft requiring the retarding effect of a brake, of a shaft receiving hub, a brake disk mounted thereon, a pressure plate having a floating tongue and groove connection with said mounting member, whereby to be free for axial movement and restrained against rotation respecting said member, said disk being confined between said member and plate, and a housing surrounding said disk and plate and detachably connected with said member, and brake control means mounted in said housing and including a pressure device acting on said plate in the direction of said member, and regulating mechanism determinative of the pressure of said device upon said plate.

15. A brake structure comprising a mounting annulus having axially extending arms provided with guide channels, means providing a surface between said arms disposed to comprise a stationary brake disk fixed with reference to said annulus, a driven disk provided with a shaft receiving mounting, a pressure plate opposed to said annulus and co-acting therewith to engage said driven disk, and means carried by said pressure plate slidably engaging the grooves of said arms for guidance axially of said annulus and restrained against rotation with respect thereto.

16. A brake structure comprising a mounting annulus having axially extending arms provided with guide channels, means providing a surface between said arms disposed to comprise a stationary brake disk fixed with reference to said annulus, a driven disk provided with a shaft receiving mounting, a pressure plate opposed to said annulus and co-acting therewith to engage said driven disk, and means carried by said pressure plate slidably engaging the grooves of said arms for guidance axially of said annulus and restrained against rotation with respect thereto, spring means acting symmetrically upon said plate and biasing said plate for movement toward said annulus, mechanism for the regulatory variation of spring pressure on said plate, and a housing detachably connected with said annulus and operatively provided with means mounting said spring means and said regulatory mechanism.

17. In a device of the character described, the combination with a fixed annulus having means providing a braking surface at its inner face and at least one arm projecting axially beyond said surface and provided with a suitable axial channel, of a shaft-receiving mounting hub approximately co-axial with said face and provided with a non-circular periphery, a set of floating friction disks apertured to fit said hub and axially slidable thereon while constrained for rotation therewith, at least one floating annulus inter-engaged between two of said disks and provided with means axially slidable in the channel of said arm, and a pressure plate biased for movement toward said first mentioned annulus, whereby to develop braking friction between said disks, said plate, and said annuli, means providing the pressure biasing said plate, and a housing carrying said last mentioned means and detachably connected with said first mentioned annulus, said housing and biasing means being unitarily removable to expose said plate, said disks, and the intervening annulus, whereby the effective braking action of the device may be predetermined according to the number of said disks and intervening annuli slidably engaged upon said hub and arm respectively between said face and said pressure plate.

18. In a device of the character described, the combination with a set of relatively rotatable and non-rotatable braking elements in operative co-action, one of said elements comprising a pressure plate, of a suitable support, biasing means interposed between said support and plate, and independently adjustable connections between said biasing means and the plate, and support, respectively, one of said connections being adjustable to compensate for wear between said braking elements and the other being adjustable to vary the pressure of said biasing means on said plate.

19. In a device of the character described, the combination of operatively co-acting relatively rotatable and non-rotatable braking elements, one of said elements comprising a pressure plate, of a suitable support, a biasing means provided with a seat adjustably mounted in said support and a second seat movable under the pressure of said biasing means to and from said support, an adjustable connection between said second seat and said plate, and a pressure relieving means connected with said second seat.

20. In a device of the character described, the combination of operatively co-acting relatively rotatable and non-rotatable braking elements, one of said elements comprising a pressure plate, of a suitable support, a biasing means provided with a seat adjustably mounted in said support and a second seat movable under the pressure of said biasing means to and from said support, an adjustable connection between said second seat and said plate, and a pressure relieving means connected with said second seat, and provided with connections including an indicator affected as to its position by the adjustment of said second seat respecting said plate.

21. A brake structure applicable to a motor casing and shaft, said structure comprising the combination with brake disks, of guide means connected with the casing and the shaft respectively and upon which said disks are respectively floatingly splined in alternate connection with said casing and shaft, a housing enclosing said disks and bodily removably connected with said casing, pressure means within said housing connected with the outermost of said disks for applying pressure to said disks, and magnetically operable means within said housing for relieving said disks of pressure, said pressure applying means and magnetically operable means being bodily removable with said housing to freely expose said disks for replacement.

22. A brake applicable to a motor casing and shaft and comprising the combination with an elongated central hub having a non-circular perimeter and connected with the shaft, of a ring connected with the motor casing and having at least one arm projecting in an axial direction, friction disks splined alternately to said hub and said arm, a housing enclosing said disks and mounted in bodily detachable connection with said ring whereby freely to expose said disks upon the removal of said housing, a pressure applying mechanism mounted within said housing for removal therewith and operatively engaging a disk splined to said arm, and electrically operable means also unitarily mounted in said housing for removal therewith, and having operative connection to said pressure applying means for relieving said last mentioned disk from the pressure thereof.

ELMER C. KIEKHAEFER.